(12) United States Patent
Fujioka et al.

(10) Patent No.: US 11,774,056 B2
(45) Date of Patent: Oct. 3, 2023

(54) METHOD FOR APPRECIATING WATER BALLS

(71) Applicant: Water Pearl Co., Ltd., Tokyo (JP)

(72) Inventors: Sadam Fujioka, Fukuoka (JP); Taro Tojima, Tokyo (JP)

(73) Assignee: WATER PEARL CO., LTD.

( * ) Notice: Subject to any disclaimer, the term of this patent is extended or adjusted under 35 U.S.C. 154(b) by 0 days.

(21) Appl. No.: 17/396,112

(22) Filed: Aug. 6, 2021

(65) Prior Publication Data

US 2022/0049826 A1     Feb. 17, 2022

(30) Foreign Application Priority Data

Aug. 11, 2020   (JP) .................................. 2020-135653

(51) Int. Cl.
| | |
|---|---|
| *F21S 10/00* | (2006.01) |
| *B05B 17/08* | (2006.01) |
| *F21S 10/06* | (2006.01) |
| *F21W 121/02* | (2006.01) |
| *G03B 21/608* | (2014.01) |

(52) U.S. Cl.
CPC .......... *F21S 10/002* (2013.01); *B05B 17/085* (2013.01); *F21S 10/06* (2013.01); *F21W 2121/02* (2013.01); *G03B 21/608* (2013.01)

(58) Field of Classification Search
CPC ....... B05B 17/085; F21S 10/002; F21S 10/06; F21W 2121/02; G03B 21/608
See application file for complete search history.

(56) References Cited

U.S. PATENT DOCUMENTS

| | | | | |
|---|---|---|---|---|
| 3,560,641 | A | * | 2/1971 | Taylor ...................... B41J 2/105 40/406 |
| 3,717,945 | A | * | 2/1973 | Taylor ...................... B41J 2/105 40/409 |
| 4,265,402 | A | * | 5/1981 | Tsai ...................... F21S 10/005 40/406 |

(Continued)

FOREIGN PATENT DOCUMENTS

JP        2013091019 A        5/2013

*Primary Examiner* — Alexander K Garlen
(74) *Attorney, Agent, or Firm* — Bracewell LLP; Brad Y. Chin

(57) ABSTRACT

A method for appreciating water balls using a water balls appreciation device, including a water balls discharge device and a light irradiation device, the method including: discharging the water balls, using the water balls discharge device, from tips of a plurality of nozzles, disposed at predetermined intervals in the lateral direction, by applying vibration to flowing water, the discharged water balls falling downwardly and in substantially a vertical plane; irradiating the water balls, using a light irradiation device, with light, the light irradiation device comprising a high-speed projector having a refresh rate of 300 Hz or more; and projecting a continuous screen of the projector in the water balls in the vertical plane regarded as a virtual screen by properly using a frame displaying a screen or an image and a frame not displaying a screen, so that a blinking duty is 20% or less, whereby the water balls are visually appreciated in the projected area. Then, by changing the timing of light emission for passing light through the image, it is possible to appreciate the movement of the water balls that changes in various manners.

3 Claims, 4 Drawing Sheets

(56) References Cited

U.S. PATENT DOCUMENTS

| | | | | |
|---|---|---|---|---|
| 5,067,653 | A * | 11/1991 | Araki | G03B 21/608 |
| | | | | 239/18 |
| 5,165,580 | A * | 11/1992 | Rosenthal | B67D 1/08 |
| | | | | 40/442 |
| 8,414,157 | B2 * | 4/2013 | Rains | F21V 33/0012 |
| | | | | 362/183 |
| 9,223,192 | B1 * | 12/2015 | Linnell | G03B 21/608 |
| 9,472,128 | B2 * | 10/2016 | Rosenthal | F21S 10/002 |
| 9,482,413 | B2 * | 11/2016 | De Vaan | F21V 9/45 |
| 10,738,954 | B2 * | 8/2020 | Bruls | B05B 17/08 |
| 11,148,165 | B2 * | 10/2021 | Fuller | B05B 17/085 |
| 2017/0181242 | A1 * | 6/2017 | Johnson | H05B 45/325 |

\* cited by examiner

METHOD FOR APPRECIATING WATER BALLS

The present application is an application based on JP2020-135653, filed on Aug. 11, 2020, with the Japanese Patent Office, the entire contents of which are incorporated herein by reference.

BACKGROUND OF THE INVENTION

Field of the Invention

The present invention relates to a method of visually appreciating water balls by illuminating light to a large number of water balls falling from above. And more particularly, the present invention relates to a method of appreciating water balls capable of letting water balls appear glittering in a region corresponding to an image projected by a projector illuminating a cluster of water balls falling in substantially vertical plane to appear it as a screen.

Description of the Related Art

Conventionally, a device for appreciating water balls is known, which is configured to inject water balls from a tip of a nozzle, by applying a predetermined frequency of vibration in the flowing water in a tank in which a plurality of nozzles is arranged in a series at predetermined intervals, and by applying the light of the strobe to the water balls, that enables to show water balls visually (e.g., see Patent Document 1).

Vibration imparted to flowing water is generated by a vibrator, and by setting the vibration frequency of this vibrator to 60 Hz, for example, 60 water balls are discharged from the nozzle per second. At the same time, by exposing the light of a strobe flashing at a frequency of around 60 Hz, it is possible to visually appreciate the water balls that shine and fall. And such a device can be put in various spaces, such as entrance halls of buildings.

[Patent Document 1] JP-A-2013-91019

SUMMARY OF THE INVENTION

Problem to be Solved by the Invention

However, in the above-described device for appreciating water balls, a visual effect of generating water balls from water discharged from a nozzle and showing water balls shining and falling is merely performed. And the device cannot add the variations in the effect, such as, for example, partially changing the movement of the water balls or changing the region in which the water balls are visible, and therefore, it is monotonous overall.

In order to give various effects, the present inventors tried to show water balls by using a normal or general-purpose type projector, but it could not show falling water balls clearly and one by one.

As a result of the investigation of a reason of it by the present inventors, it turned out that the refresh rate of the projector and the duty ratio of blinking are related to visibility of projected water balls. More specifically, it was found out that it cannot produce beautiful water balls in a projector having the duty ratio of blinking of 50% and a high-speed projector having a refresh rate of several hundred Hz is required.

The present invention has been invented based on the above-mentioned findings so as to solve the problem in the conventional device for appreciating water balls, and an object of the present invention is to provide a method for appreciating water balls capable of presenting the various visual effects of water balls by using a high-speed projector.

In order to achieve the above object, the present invention adopts the constitution described in the claimed invention. More specifically, the present invention provides a method for appreciating water balls using a water balls appreciation device, the water balls appreciation device including a water balls discharge device and a light irradiation device, the method comprising: discharging the water balls, using the water balls discharge device, from tips of a plurality of nozzles, disposed at predetermined intervals in the lateral direction, by applying vibration to flowing water, the discharged water balls falling downwardly and in substantially a vertical plane; irradiating the water balls, using a light irradiation device, with light, the light irradiation device including a high-speed projector having a refresh rate of 300 Hz or more; and projecting a continuous screen of the projector in the water balls in the vertical plane regarded as a virtual screen by properly using a frame displaying a screen or an image and a frame not displaying a screen, so that a blinking duty is 20% or less, whereby the water balls are visually appreciated in the projected area.

Note that the "frame" refers to a screen of one of consecutive screens projected by the projector and a time for displaying the screen. However, the time at that this frame points to is not only the time for displaying the screen of the lit state, but also it represents the time for displaying the true black screen of the off state.

The high-speed projector of the present invention has a refresh rate of 300 Hz or more and a duty ratio of 20% or less of blinking performance. The condition of the light irradiation device is based on the fact that, in the different condition, the water balls adjacent in the vertical direction tend to appear as lines, and the water balls cannot be respectively and clearly displayed one by one.

As an alternative higher-speed projector, having a refresh rate of 600 Hz, a duty ratio of 10%, or having a refresh rate of 960 Hz, a duty ratio of 6.25%, or the like can be used. And by those high-speed projectors, it is possible to make the water balls appear more clearly and beautifully.

In the present invention, it is possible to take a method in which a water ball is visible only in a partial region of the screen by masking a certain portion of the screen.

By this masking, the frame that displays the screen and the frame that does not display it are properly used, and instead of the white screen, only a part of the frame that displays on the "frame that displays the screen" is displayed on a white screen, for example, a screen in which a white circle is drawn on a black background, so that light is projected only on a part of the water balls of water, and the water balls of water can be seen in a part of the screen.

Further, in the present invention, the position at which light is projected onto the water balls and the frequency and phase of blinking of the projected light may be simultaneously controlled so that the water balls appear to move up, down, left, and right.

According to the present invention, when a cluster of a large number of water balls falling on the substantially vertical plane is regarded as a screen, the water balls can be displayed by projecting an image projected by a high-speed projector on the screen.

When the refresh rate of the high-speed projector is 300 Hz or more and the duty ratio is 20% or less, the water balls adjacent to each other in the vertical direction are separated from each other, and independent water balls can be visually appreciated one by one. Accordingly, it is possible to change the position, the moving direction, the color, or the like of the water balls in accordance with the change of the projected image, and it is possible to appreciate the water balls with various variations.

If a portion of the screen or image by the projector is masked, it is possible to show water balls on a portion of the screen, rather than water balls on the entire screen, and it is possible to change the position at which water balls are visible in the area of the screen by changing the position at which the masking is performed.

Furthermore, by controlling the projected position, the frequency, and phase of the light blinking, it is possible to produce an effect that the water balls can be seen as if they are moving in the screen.

In addition, if the above methods are optionally combined, it is possible to show water balls in a different visual effect.

DETAILED DESCRIPTION

The method for appreciating water balls according to the present embodiments will be described with reference to the attached drawings.

Figure 1:
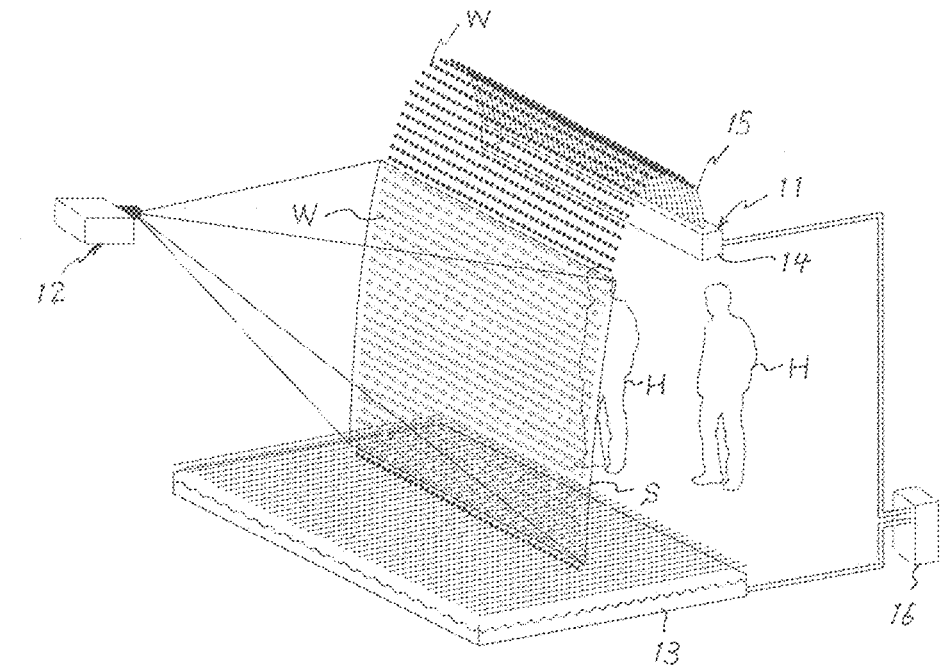
FIG. 1 is a schematic perspective view for explaining a method of displaying water balls by projecting a screen of a projector onto the water balls using the water balls appreciation device in the embodiment.

As shown in FIG. 1, the device for appreciating water balls in a present embodiment is configured to include a water ball discharging device 11 and a high-speed projector 12 as a light irradiation device.

The water ball discharging device 11 is provided with a water tank 13 which is installed on the floor and can store a fixed amount of water, a tank 14 which is disposed on the water tank 13 and extends along the width direction of the water tank 13, a number of nozzles 15 which are arranged at predetermined intervals on the upper surface of the tank 14, a pump 16 which circulates water from the water tank 13 to the tank 14 so as to discharge (inject) water from the nozzle 15, and vibration applying means consisting of a vibrator (not shown) or the like for imparting vibration to the water in the tank 14 at a predetermined frequency.

The nozzle 15 is adapted to discharge the water balls W in accordance with a frequency set to the vibration applying means. For example, when vibration is imparted at 60 Hz, so that it can discharge 60 water balls W per second. Incidentally, the size of the water ball W is determined by the opening diameter of the nozzle 15.

The nozzles 15, each of which is supported by the tank 14 in substantially the same posture inclined to the water tank 13. By this inclination, the water balls W discharged from each nozzle 15 draws a parabola upward, thereafter, it is adapted to form a screen S by cluster of water balls falling downward in a substantially vertical plane. The water balls W discharged from each nozzle 15 are not dropped in a single vertical plane in a strict meaning, but there may also be a row of water balls falling by generating a slight deviation in a direction perpendicular to the vertical plane. And even in this case, it can be considered to be in a single vertical plane.

The high-speed projector 12 uses an LED as a light source, where a refresh rate of 300 Hz, a duty ratio of 20% (lighting of blinking:off is 1:4), a refresh rate of 600 Hz, a duty ratio of 10% (lighting of blinking:off is 1:9), a refresh rate of 960 Hz, a duty ratio of 6.25% (lighting of blinking:off is 1:15) or the like is adopted.

As the high-speed projector 12, a projector "TB-UK-DYNAFLASH" or "TB-V3-DYNAFLASH" by Tokyo Electron Devices, Inc., would be preferably used but is not limited thereto.

Figure 2:
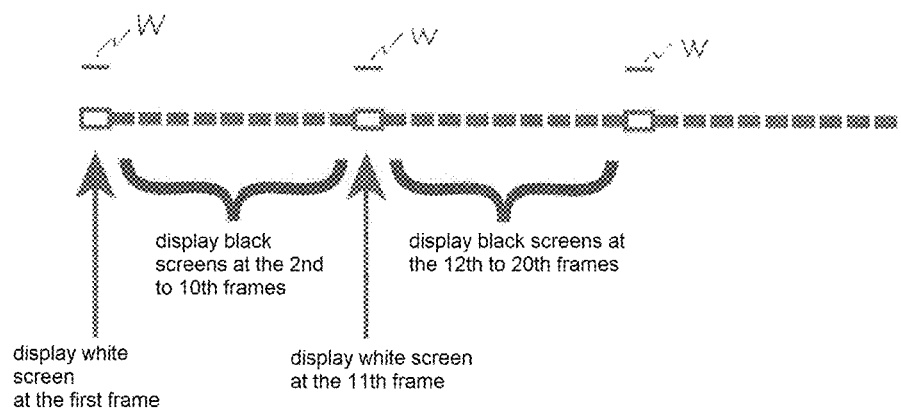
FIG. 2 is illustration showing the relationship between the frame constituting the screen and the water ball.

FIG. 2 shows the relationship between a frame (screen) and water balls when water balls are illuminated by using a high-speed projector with a refresh rate of 600 Hz and a duty ratio of 10% and a water ball discharge device having a vibration frequency of 60 Hz. As shown in FIG. 2, by displaying a bright white screen (a frame displaying a screen) on the first and the eleventh frames, and displaying a bright black screen (a frame not displaying a screen) on the second to the tenth frames and on the twelfth to twentieth frames, it is possible to show a water ball W. As shown in FIG. 1, it is possible to show a water ball W that looks still in the air almost equally as a whole in the whole area of the screen S to the viewer H.

As described above, in method for appreciating water balls of the present embodiment, a screen to be projected onto a screen formed by the water balls W are prepared, and the water balls W can be displayed by irradiating the screen with light.

Figure 3:
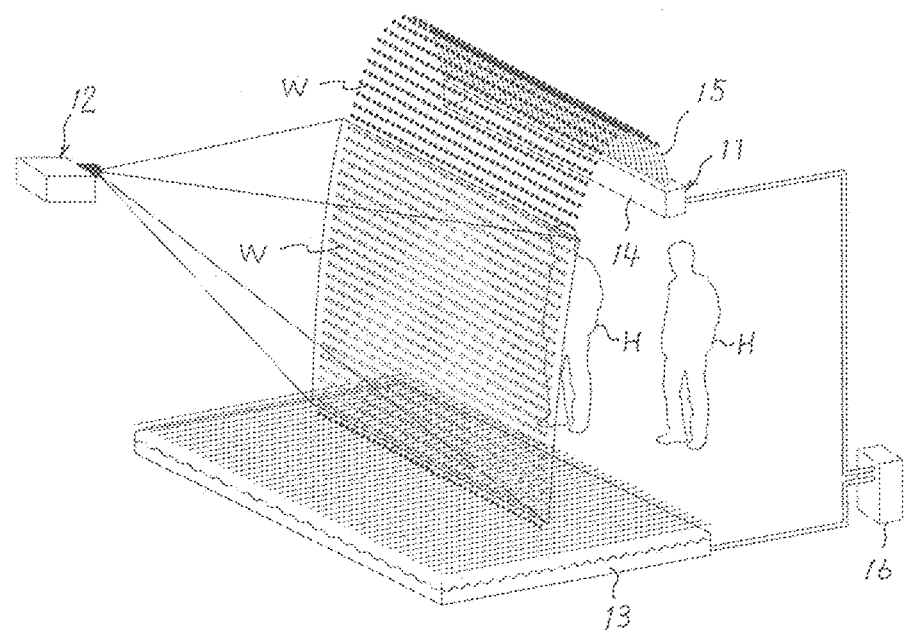
FIG. 3 is a schematic perspective view showing a state in which a portion of the region of the water ball group is illuminated.

FIG. 3 shows a case in which only a part of the water balls W in the screen S are shown by illuminating them. This method uses the frame that displays the above-mentioned screen and the frame that does not display, and displays only a part of the white screen (a screen with a white A on a black background) instead of the white screen, so that some of the water balls of the screen are illuminated. FIG. 3 shows a state in which a letter "A" is drawn in white on a black screen is projected, and the water balls at the portion "A" appear illuminated. In FIG. 3, the water balls are also shown outside the area of "A", but in reality, this portion is projected on a screen masked in black, so that the water balls are not visible in a room without no external light enters.

Figure 4:
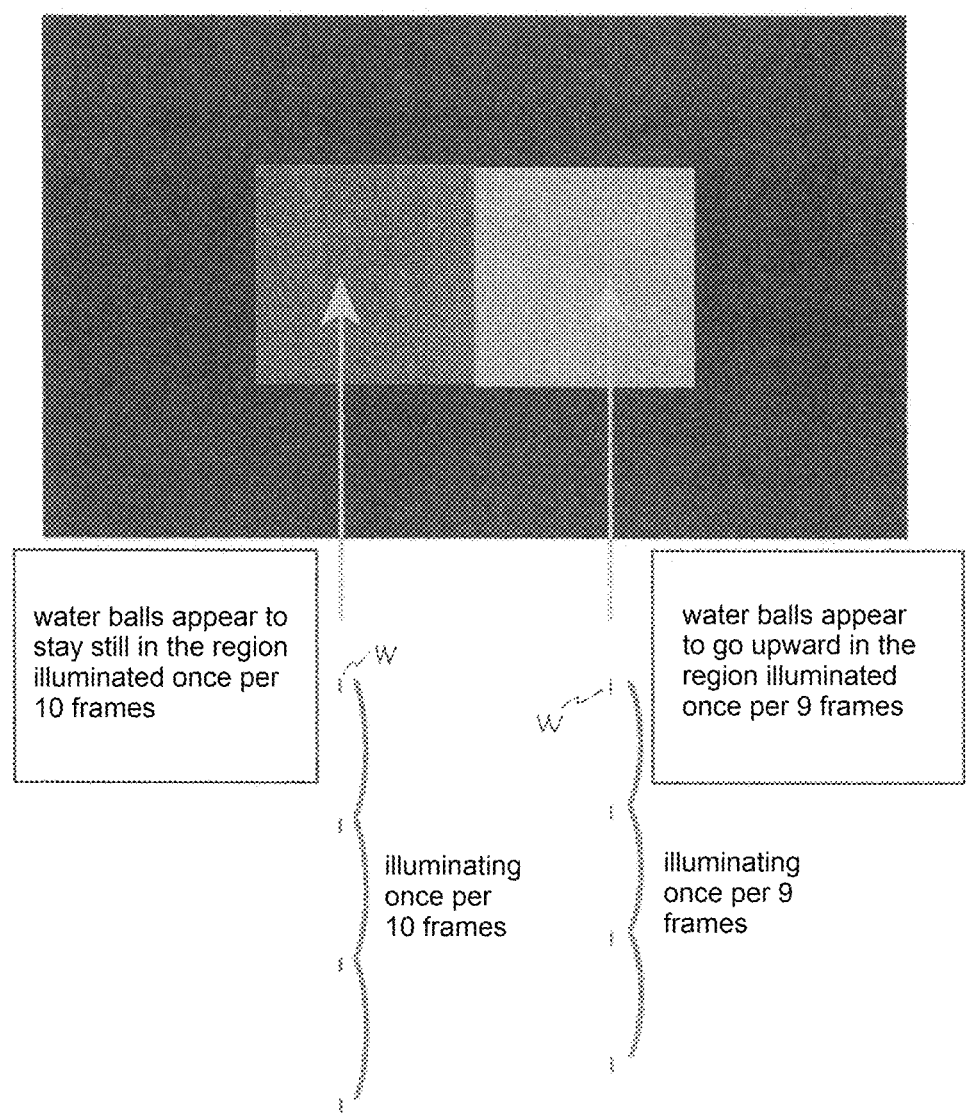
FIG. 4 is an explanatory diagram showing the situation in which the appearance of water balls is different depending on the timing of passing the light through the coma.

In FIG. 4, as another water ball effect method, a state of projecting lights in various frequencies for each portion of the water balls are shown.

This example is a case in which lights in various frequencies are projected for each part (area) of water balls in a screen in a case in which water balls are discharged using a projector of 600 Hz and a water ball discharge device having a vibration frequency of 60 Hz. Here, in the region on the left side of the center portion of the screen, the water balls can be made to look still in the air by emitting light once every 10 frames, i.e., by projecting a white screen. On the other hand, in the region on the right side of the center portion of the screen S is provided so as to emit light once every nine frames (to project a white screen), thereby, in the region of the right side, the timing of passing the light by projecting a white screen is relatively faster than the region of the left side, and as a result, the water balls appear to be rising.

Figure 5:
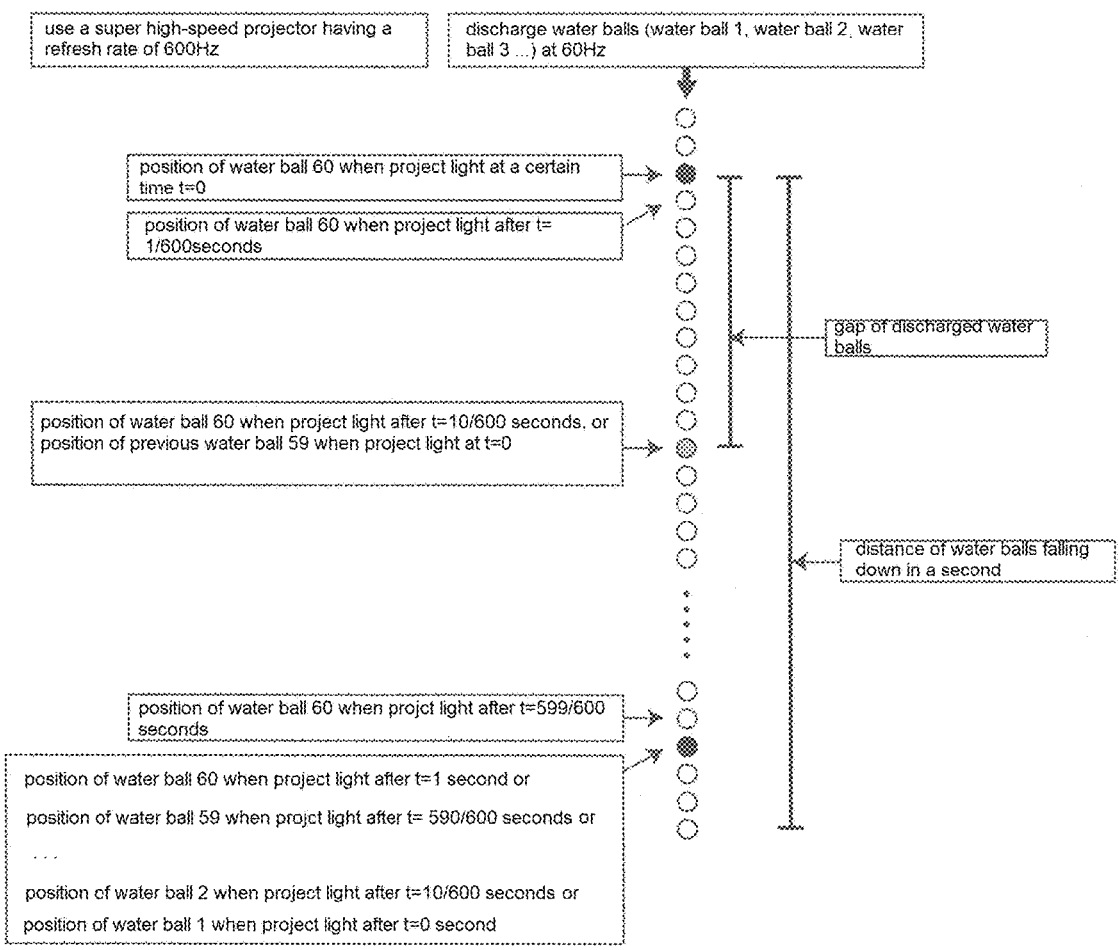
FIG. 5 is illustration illustrating the principle of pseudo-movement that makes the water ball appear to move up, down, left, or right using the phase difference.

FIG. 5 shows the principle (pseudo-movement) of the combination of the above-described methods of presenting water balls so that the illuminated water balls appear to move up, down, left, and right.

Here, a relationship between a certain time and a position of water balls is shown when a high-speed projector of 600 Hz is used and water balls are discharged (injected) at 60 Hz.

In the present embodiment, since the speed of projector 12 is sufficiently high, it is possible to make the water balls can be appeared moving up and down as if they are moving voluntary by shifting the phase to illuminate the projector 12 while fixing the refresh rate and the vibration frequency in the water balls discharge device 11. That is, in FIG. 5, by changing the timing to emit light per frame without changing the period of emitting at 10 frames, it is possible to move the visible position of water balls vertically in a state where the water balls are pseudo stationary in the air.

By using such relationship of phases, for example, it is possible to show a complicated motion of water balls as if water balls jumping or dancing up and down in accordance with music. Although the lateral movement depends on the interval of the nozzle 15 in the water ball discharge device 11, the longitudinal movement can move the water balls up and down with a fineness obtained by dividing the distance at which the water balls fall in one second by 600 by changing which timing of the 600 Hz to project the light.

It is possible to project the motion pictures generated by the present invention by letting a video player dedicated to projection mapping to read a video created and stored in advance as images. Also, within a projection application dedicated to projection mapping, the timing of the projection to generate and project a screen in real-time by programming can both be determined by computation in software.

Specifically, based on the positional relationship between the installed projector and the nozzles of the water balls discharge device, the locus of the water balls is simulated on a three-dimensional basis, and a signal for vibrating the nozzles is taken out from the controller of the water balls discharge device and used the signal as an input signal, so that it is possible to grasp which position of the water balls on the space at which time, and to derive by calculation at which timing the light can be projected onto the water balls at the targeted position if the projector is made to emit light.

As described above, the best configuration, method, and the like for carrying out the present invention are disclosed in the above description, but the present invention is not limited thereto.

That is, although the present invention has been primarily illustrated and described with reference to specific embodiments, various modifications may be made by those skilled in the art, such as shapes, positions, or arrangements, to the embodiments described above without departing from the spirit and scope of the invention.

For example, the above embodiment teaches the case where the viewer H is positioned on the opposite side of the projector with the screen interposed therebetween, the viewer H may be positioned at the projector side. However, in this case, the viewer is positioned outside the area through which the light passes.

The refresh rate of the projector may be 300 Hz or more, the vibration frequency of the water ball discharge device is not limited to 60 Hz, can be changed in a range in which the water ball can be formed.

The present invention is not limited to the case where the duty ratio of the projector is fixed, and by changing the number of frames for displaying the screen, it is possible to change the blinking duty ratio and to effect expansion and contraction of the length in the vertical direction of the visible balls in real time.

The nozzles 15 may not be disposed in the upward direction, but may be disposed so as to depend from the tank 14. According to this, each row of dropping water balls is accurately located in one vertical plane.

DESCRIPTION OF REFERENCE NUMERALS

11: water balls discharge device, 12: high-speed projector, 15: nozzles, H: viewer, S: screen, W: water balls.

What is claimed is:

1. A method for appreciating water balls using a water balls appreciation device, the water balls appreciation device comprising a water balls discharge device and a light irradiation device, the method comprising:
   discharging the water balls, using the water balls discharge device, from tips of a plurality of nozzles, disposed at predetermined intervals in the lateral direction, by applying vibration to flowing water, the discharged water balls falling downwardly and in substantially a vertical plane;
   irradiating the water balls, using a light irradiation device, with light, the light irradiation device comprising a high-speed projector having a refresh rate of 300 Hz or more;
   projecting a continuous screen of the projector in the water balls in the vertical plane regarded as a virtual screen by properly using a frame displaying a screen or an image and a frame not displaying a screen, so that a blinking duty is 20% or less, whereby the water balls are visually appreciated in the projected area,
   wherein lights having various blinking frequencies are projected respectively to different water balls in the continuous screen.

2. The method for appreciating water balls of claim 1, wherein the water balls are visible in a region of a portion of the virtual screen by masking a portion of the screen.

3. The method for appreciating water balls of claim 1, wherein a position at which light is projected onto the water balls and a frequency and a phase of blinking of the projected light are simultaneously controlled so that the water balls appear as if moving up, down, left, and right.

* * * * *